(12) United States Patent
Yoon et al.

(10) Patent No.: US 7,876,668 B2
(45) Date of Patent: *Jan. 25, 2011

(54) OPTICAL RECORDING MEDIUM WITH DIFFERENT WOBBLE CHARACTERISTICS BETWEEN THE USER DATA AREA AND THE LEAD-OUT AREA

(75) Inventors: Du-seop Yoon, Gyeonggi-do (KR); Kyung-geun Lee, Gyeonggi-do (KR); Byoung-ho Choi, Gyeonggi-do (KR); Jae-seong Shim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 112 days.

This patent is subject to a terminal disclaimer.

(21) Appl. No.: 12/039,220

(22) Filed: Feb. 28, 2008

(65) Prior Publication Data
US 2008/0144480 A1    Jun. 19, 2008

Related U.S. Application Data

(63) Continuation of application No. 11/588,360, filed on Oct. 27, 2006, now Pat. No. 7,366,084, which is a continuation of application No. 10/790,861, filed on Mar. 3, 2004, now Pat. No. 7,274,651, which is a continuation of application No. 10/007,655, filed on Dec. 10, 2001, now Pat. No. 6,772,429.

(30) Foreign Application Priority Data

Jun. 18, 2001   (KR) ............................... 2001-34377

(51) Int. Cl.
   *G11B 7/24*    (2006.01)
   *G11B 7/007*   (2006.01)
(52) U.S. Cl. .............. 369/275.4; 369/275.3; 369/44.13; 369/278; 720/718

(58) Field of Classification Search ... 369/275.1–275.5, 369/277–279, 272, 59.26, 124.04, 59.25, 369/53.34, 47.48, 44.13, 47.16, 47.27, 53.22; 720/718

See application file for complete search history.

(56) References Cited

U.S. PATENT DOCUMENTS

| 5,493,558 A | 2/1996 | Kihara |
| 5,940,364 A | 8/1999 | Ogata et al. |

(Continued)

FOREIGN PATENT DOCUMENTS

| CN | 1208917 A | 2/1999 |
| EP | 0 325 330 | 7/1989 |
| EP | 0 512 643 | 11/1992 |
| EP | 0 536 764 | 4/1993 |
| JP | 2000-231722 | 8/2000 |
| JP | 2002-260240 | 9/2002 |

OTHER PUBLICATIONS

Chinese Office Action issued Nov. 28, 2003 re: Chinese Application No. 01130317.4.

(Continued)

*Primary Examiner*—Ali Neyzari
(74) *Attorney, Agent, or Firm*—NSIP Law

(57) ABSTRACT

An optical recording medium has a user data area and a lead-out area, wherein the user data area and the lead-out area each has grooves and lands formed thereon. Wobbles are formed on at least one lateral surface of grooves of the user data area and the lead-out area, and configured such that wobble characteristics are made different between the user data area and the lead-out area. Different types of wobbles are formed on the grooves of either the user data area or the lead-out area, thereby preventing an optical pickup that performs recording/reproduction from deviating from the user data area. Also, in a multi-layer optical recording medium, a whole area of a recording layer is configured to have a same condition, thereby preventing deterioration in reproduction and/or recording due to a difference in light power transmittance of another recording layer.

7 Claims, 5 Drawing Sheets

U.S. PATENT DOCUMENTS

| | | | |
|---|---|---|---|
| 6,069,870 | A | 5/2000 | Maeda et al. |
| 6,195,325 | B1 | 2/2001 | Okanishi |
| 6,198,710 | B1 | 3/2001 | Hori et al. |
| 6,201,778 | B1 * | 3/2001 | Sensyu .................... 369/53.34 |
| 6,208,614 | B1 | 3/2001 | Kim |
| 6,621,772 | B2 * | 9/2003 | Asano et al. ............. 369/44.26 |
| 6,633,534 | B1 | 10/2003 | Tosaki et al. |
| 6,772,429 | B2 | 8/2004 | Yoon et al. |
| 6,775,222 | B2 * | 8/2004 | Aoki ..................... 369/124.04 |
| 6,847,594 | B1 * | 1/2005 | Lee ........................ 369/44.13 |
| 6,967,918 | B2 * | 11/2005 | Lee et al. ................. 369/59.25 |
| 7,000,239 | B2 | 2/2006 | Yoon et al. |
| 7,065,015 | B2 | 6/2006 | Lee et al. |
| 7,088,670 | B2 * | 8/2006 | Kondo .................... 369/275.4 |
| 7,123,559 | B2 | 10/2006 | Lee et al. |
| 7,123,568 | B2 * | 10/2006 | Choi et al. ............... 369/59.25 |
| 7,164,647 | B2 | 1/2007 | Lee et al. |
| 7,184,391 | B2 * | 2/2007 | Lee et al. ................. 369/275.4 |
| 7,274,651 | B2 | 9/2007 | Yoon et al. |
| 7,400,560 | B2 * | 7/2008 | Lee et al. ................. 369/47.27 |
| 2001/0050888 | A1 | 12/2001 | Eguchi et al. |
| 2003/0179689 | A1 | 9/2003 | Yoon et al. |

OTHER PUBLICATIONS

European Patent Office Search Report issued Mar. 19, 2004 re: European Patent Application No. 02254074.4.
Japanese Office Action issued Sep. 14, 2004 re: Japanese Application No. 2001-365201.
U.S. Appl. No. 11/588,360, filed Oct. 27, 2006, Du-Seop Yoon, et al., Samsung Electronics Co., Ltd.
U.S. Appl. No. 12/039,198, filed Feb. 28, 2008, Du-Seop Yoon, et al., Samsung Electronics Co., Ltd.
U.S. Appl. No. 12/039,230, filed Feb. 28, 2008, Du-Seop Yoon, et al., Samsung Electronics Co., Ltd.
U.S. Appl. No. 11/432,335 filed May 12, 2006, Du-Seop Yoon, et al.
ANSI INCITS 340-2000, *Information Technology-AT Attachment with Packet Interface-5 (ATA/ATAPI-5)*, Dec. 13, 2000, entire document, but note particularly pp. i-ix, 1, 19-29, 213-223, and Annex F (pp. 380-384), American National Standards Institute, New York.
U.S. Appl. No. 10/007,655 filed Dec. 10, 2001, Du-Seop Yoon et al.
U.S. Appl. No. 10/790,702 filed Mar. 3, 2004, Du-seop Yoon et al.
U.S. Appl. No. 10/790,861 filed Mar. 3, 2004, Du-Seop Yoon et al.
U.S. Appl. No. 11/074,874 filed Mar. 9, 2005, Du-Deop Yoon et al.
U.S. Appl. No. 11/408,009 filed Apr. 21, 2006, Du-seop Yoon et al.

\* cited by examiner

MIRROR

PIT

GROOVE

GROOVE MARK

OPTICAL RECORDING MEDIUM WITH DIFFERENT WOBBLE CHARACTERISTICS BETWEEN THE USER DATA AREA AND THE LEAD-OUT AREA

CROSS-REFERENCE TO RELATED APPLICATIONS

This application is a continuation of application Ser. No. 11/588,360 filed on Oct. 27, 2006, now U.S. Pat. No. 7,366,084, which is a continuation of application Ser. No. 10/790,861 filed on Mar. 3, 2004, now U.S. Pat. No. 7,274,651, which is a continuation of application Ser. No. 10/007,655 filed on Dec. 10, 2001, now U.S. Pat. No. 6,772,429, which claims the benefit of Korean Application No. 2001-34377 filed on Jun. 18, 2001, in the Korean Intellectual Property Office, the disclosure of which is incorporated herein by reference.

BACKGROUND OF THE INVENTION

1. Field of the Invention

The present invention relates to an optical recording medium, and more particularly, to an optical recording medium having wobbles formed on at least one lateral surface of grooves of a user data area and grooves of a lead-out area, and configured such that wobble characteristics are made different between the user data area and the lead-out area.

2. Description of the Related Art

In general, optical recording media are widely employed as information recording media for an optical pickup device for recording/reproducing information. The optical recording media are classified into read-only-memory (ROM) compact discs (CDs) and digital versatile discs (DVDs) according to information recording capacity. Further, a DVD disc capable of writing, erasing and reading information can be sub-divided into a digital versatile disc-random access memory (DVD-RAM) disc and a digital versatile disc-rewritable (DVD-RW) disc.

In such a DVD-RAM or DVD-RW disc, as shown in FIG. 1, there is a lead-in area 10 in which read only data, such as disc size, number of track layers on a readable plane or illegal copy preventing information, is recorded, a user data area 20 in which user data can be repeatedly read and/or written, and a lead-out area 30 in which other disc-related information is recorded.

As indicated by a portion "C" of FIG. 1, there are grooves 23 and lands 25 alternatively formed in the user data area 20, so as to perform recording and/or reproducing information marks 27 along a predetermined track. In FIG. 1, reference numeral 40 denotes a reproduction beam. From enlarged portions of the lead-in area 10 ("A") and the lead-out area 30 ("B"), it is confirmed that physical pits 15, which are read only data, are formed thereon. Here, the lead-out area 30 performs various functions. For example, the lead-out area 30 guards an optical pickup so as not to deviate from a user data area while the optical pickup performs recording/reproduction.

In particular, as shown in FIG. 2, in a dual-layer optical recording medium having a first recording layer L0 and a second recording layer L1 of opposite track paths, the lead-out area 30 allows an optical pickup to keep performing tracking during interlayer jumping from the outermost circumference of the first layer L0 to the outermost circumference of the second layer L1 without deviating from the track paths. The opposite tracks are sequentially addressed from the inner circumference of the first recording layer L0 to the outer circumference thereof, and then from the outer circumference of the second recording layer L1 to the inner circumference thereof.

In a dual-layer ROM disc, an area serving as a lead-out area varies according to the reproduction method of a second layer. In case of a dual-layer ROM disc having opposite track paths, a middle area is separately provided at each of the outer circumferences of the first and second recording layers. However, in case of a rewritable optical recording medium, both pits and grooves can be used Therefore, in case of dual layer rewritable optical recording media, recording power is affected by the physical geometry of the first recording layer L0 during recording of data. In other words, when recording is performed on the second recording layer L1, a recording light beam passes through the first recording layer L0, resulting in a difference in the transmittance between pit portions and groove portions.

Light power was measured for an optical recording medium at a mirror area, a pit area, a groove area and a groove area with marks, for simulation of the light power depending on a difference in the transmittance according to various conditions of the first recording layer L0, as shown in FIGS. 3A through 3D. Here, the number of tracks trapped by laser beam transmitted through a lens was taken into consideration.

Tables 1 and 2 list input parameters and items for experimentation. In Table 1, Rc represents the reflectivity of a crystallized portion of a recording layer and Ra represents the reflectivity of an amorphous portion of a recording layer.

TABLE 1

| Parameter | Condition |
| --- | --- |
| Wavelength (nm) | 400 |
| Numerical Aperture (NA) | 0.65/0.85 |
| Minimum mark length (μm) | 0.275/0.194 |
| Modulation | EFM+ (Eight-to-Fourteen Modulation-plus) |
| Track pitch (TP) (μm) | 0.30, 0.34, 0.38 |
| Reflectivity (%) | Rc = 25, Ra = 5 |

TABLE 2

| Item | Factor | Example |
| --- | --- | --- |
| Dual recording layer | Structure of first recording layer | Mirror, pits, grooves,, grooves with marks. |
| High NA | Number of tracks trapped by laser beam Incident angle of beam | 85 for 0.65 of NA 160 for 0.85 of NA 40.5° for 0.65 of NA 58.2° for 0.85 of NA |

FIG. 4 is a graph showing the measurement result of light power depending on the transmittance for the cases shown in FIGS. 3A, 3B, 3C and 3D. With reference to FIG. 4, according to the simulation result, a decrease in the light power is smallest in the mirror portion (graph line with solid squares), and the light power gradually decreases more in the order of a pit portion (graph line with solid diamonds), a groove portion (graph line with solid triangles block) and a groove mark portion (graph line with solid circles). Therefore, as shown in FIG. 4, in the case of a dual layer disc, the transmittance varies according to the physical geometry of the first recording layer L0, which in case of a rewritable optical recording medium can further affect the recording power during recording of data.

SUMMARY OF THE INVENTION

To solve the above problems, it is an object of the present invention to provide an optical recording medium having a lead-out area configured to prevent a pickup from deviating from a user data area during recording and/or reproduction of data, without affecting the recording power. The present invention can be applied to optical recording media, which include optical rewritable recording media. In particular, in case of multi-layer optical recording media the present invention unifies the physical geometry of a recording layer as well as provides a discriminating lead-out area. For example, in a dual layer rewritable optical recording media, the present invention unifies the physical geometry of a first recording layer L0 of the dual layer disc (i.e., wobbles formed on at least one lateral surface of each groove provide a uniform transmittance of an optical light beam passing through a recording layer) as well as newly defines a lead-out area or a middle area to perform a guard function. A middle area means each outer circumference of the first and second recording layers in opposite tracks. That is, the opposite tracks are sequentially addressed from the inner circumference of the first recording layer L0 to the outer circumference thereof, and then from the outer circumference of the second recording layer L1 to the inner circumference thereof.

Additional objects and advantages of the invention will be set forth in part in the description which follows and, in part, will be obvious from the description, or may be learned by practice of the invention.

Accordingly, to achieve the above and other objects of the invention, there is provided an optical recording medium having a user data area and a lead-out area, wherein the user data area and the lead-out area each has grooves and lands formed thereon, wobbles are formed on at least one lateral surface of each of the grooves, and the wobbles of the lead-out area have different characteristics from those of the user data area.

Further, the wobbles of the lead-out area are formed by modulating at least one feature of frequency, period, amplitude and phase of the wobbles of the user data area.

Further, the wobbles may include addressing information or reference time information in the form of phase locked loop (PLL).

Further, in addition to the different wobbles in the user data area and the lead out area, synchronization patterns of signals read from the grooves of the user data area and the lead-out area are different.

Further, in addition to the different wobbles in the user data area and the lead-out area, predetermined recording patterns are recorded on the outermost circumference of the optical recording medium to prevent an optical pickup from deviating from the user data area during recording and/or reproduction of data.

In another aspect of the present invention, there is provided an optical recording medium having a user data area and a lead-out area, wherein predetermined recording patterns are recorded on the outermost circumference of the optical recording medium to prevent an optical pickup from deviating from the user data area during recording and/or reproduction of data.

Another aspect of the present invention provides an optical recording medium having a user data area and a lead-out area, wherein the user data area and the lead-out area each has grooves and lands formed thereon, and different types of synchronization patterns are used in the lead-out area and the user data area.

Also, two or more recording layers may be provided for multi-layer recording.

Further, in case of multi-layer recording media, the two or more recording layers have different recording patterns in their lead-out areas.

Further, in case of multi-layer recording media, the two or more recording layers have different synchronization patterns in their lead-out areas.

Further, in the case of multi-layer recording media, the lead-out area has a width of two or more times the maximum allowance of disc eccentricity.

BRIEF DESCRIPTION OF THE DRAWINGS

The above objects and advantages of the present invention will become more apparent by describing in detail example embodiments thereof with reference to the attached drawings in which.

DETAILED DESCRIPTION OF THE PREFERRED EMBODIMENTS

Figure 1:
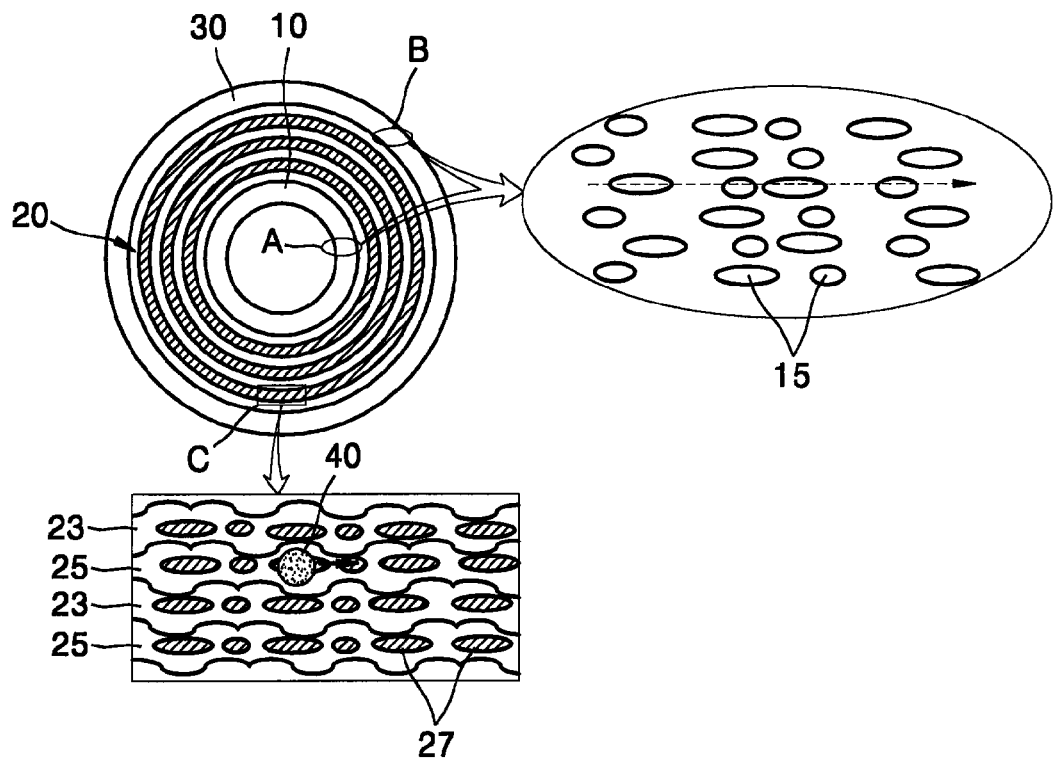
FIG. 1 shows an enlarged view illustrating portions A, B and C of a conventional optical recording medium.
Figure 2:
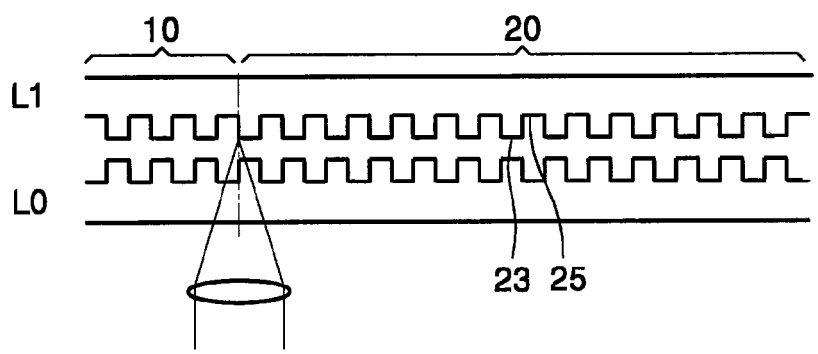
FIG. 2 is a partially cross-sectional view illustrating a conventional optical recording medium.
Figure 3A:
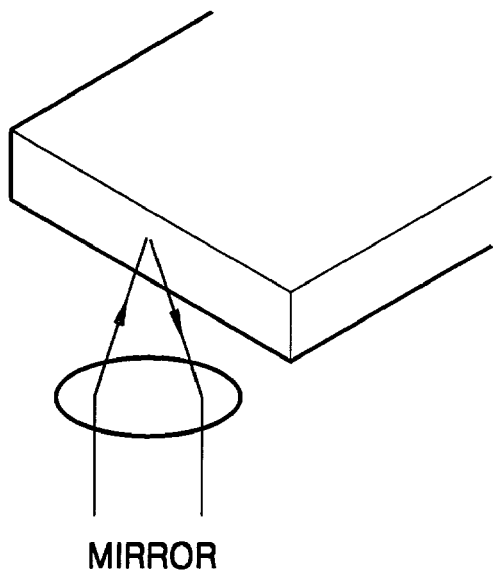
FIGS. 3A through 3D illustrate various portions of the conventional optical recording medium.
Figure 3B:
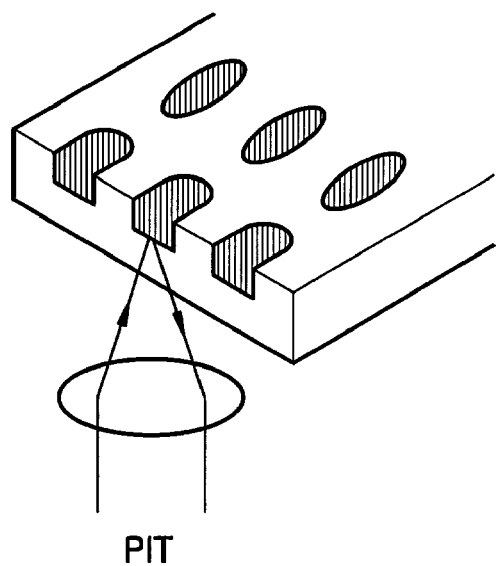
Figure 3C:
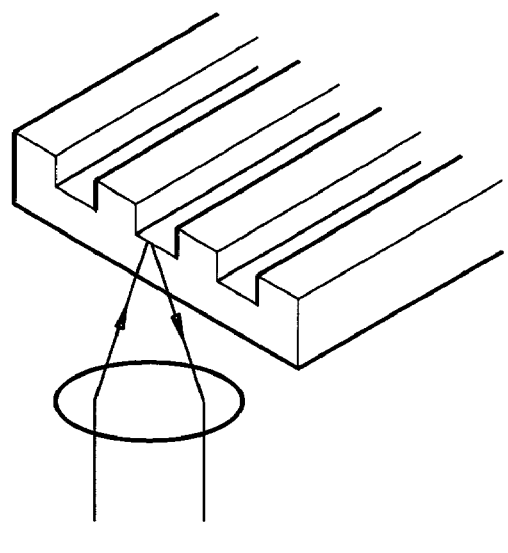
Figure 3D:
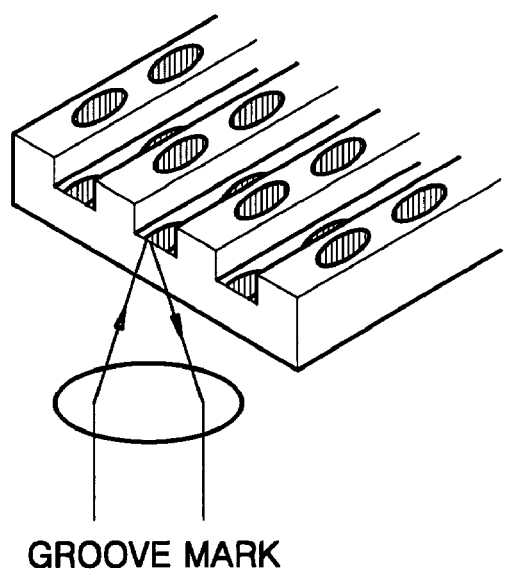
Figure 4:
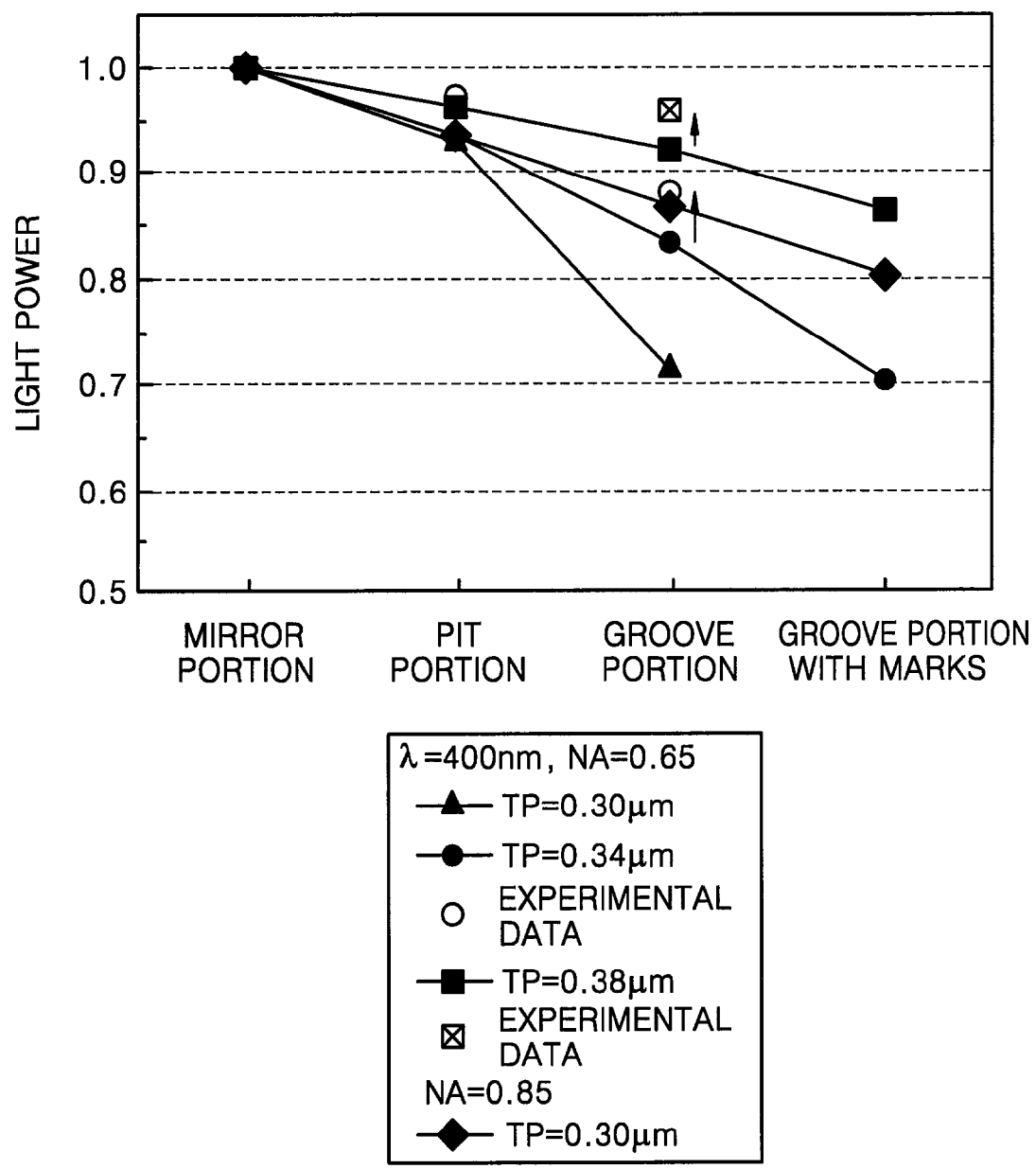
FIG. 4 illustrates the experimental result of light power for various cases.

Hereinafter, example embodiments of the present invention will be described in detail with reference to the attached drawings where like reference numerals refer to the like elements throughout. The embodiments are described below to explain the present invention by referring to the figures and to more completely explain the present invention to anyone skilled in the art. The present invention is not restricted to the following embodiments, and many variations are possible within the spirit and scope of the present invention, the scope of which is defined in the claims and their equivalents.

Figure 5:
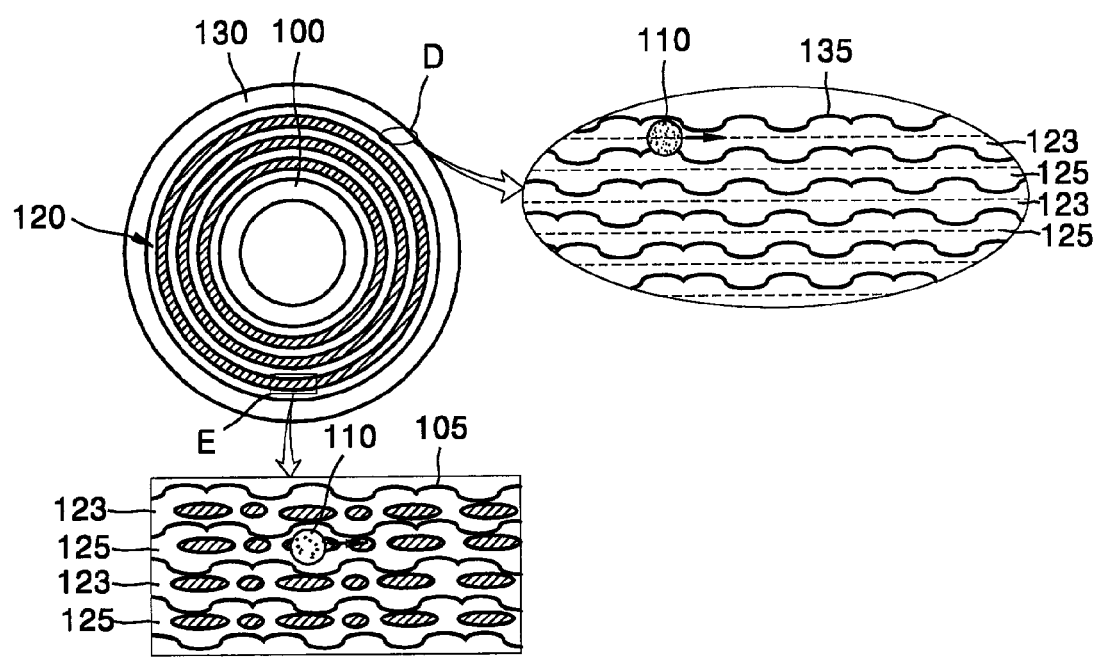
FIG. 5 is an enlarged view illustrating portions A, B and C of an optical recording medium according to the present invention.

Referring to FIG. 5, an optical recording medium according to the present invention includes a lead-in area 100, a user data area 120 and a lead-out area 130, each area having grooves 123 and lands 125 formed thereon. Wobbles 105 and 135 are formed on at least one lateral surface of each of grooves 123 and lands 125 in the user data area 120 and the lead-out area 130. Here, a portion "E" of the user data area 120 and a portion "D" of the lead-out area 130 are enlarged and shown in FIG. 5. Reference numeral 110 denotes a laser beam.

As described above, the lead-out area 130 has a guard function that prevents an optical pickup (not shown) from deviating from the user data area during recording and/or reproduction of data, and in case of a dual-layer disc the lead-out area can keep/maintain tracking while interlayer jumping from the outermost circumference.

In an optical recording medium according to a first embodiment of the present invention, to provide the guard function, wobbles different from the wobbles 105 in the user data area 120 are formed in an area beyond a predetermined radius of the optical recording medium (i.e., a lead-out area).

In other words, at least one kind of features including periods, frequencies, amplitudes and phases of the wobbles 105 and 135 are modulated in the user data area 120 and the lead-out area 130. The wobbles may include addressing information or reference time information in the form of phase locked loop (PLL).

For example, the wobbles of the lead-out area 130 can be formed by modulating at least one feature of frequency, period, amplitude and phase of the wobbles of the user data area 120 as follows. In case of modulating the frequencies of the wobbles 105 and 135, the wobble 135 of the lead-out area 130 may be formed to have a frequency of n times (n is a real number) the basic frequency of the wobble 105 of the user data area 120. The differing wobbles of the user data area 120 and the lead out area 130 unify the physical geometry of the optical recording medium as well as provide a discriminating lead-out area as a guard. In other words, the wobbles formed on at least one lateral surface of each groove according to the present invention provide a uniform transmittance of an optical light beam passing through a recording layer. For example, to unify the physical geometry of the disc and to serve as a guard, the lead-out area 130 may be configured such that the wobble 135 has a frequency of 2 times that of the user data area 120.

Further, in case of modulating the wobble period T, the wobble 105 of the user data area 120 and the wobble 135 of the lead-out area 130 can, for example, have periods 200T and 100T, respectively, so that the lead-out area 130 can be discriminated.

Further, after completion of manufacture of the disc, 00h as pattern data may be recorded in the lead-out area 130. Accordingly, the 00h pattern data is read out by a channel 1 (Ch1) during recording/reproduction, and the wobble frequency and/or period can be read out by a channel 2 (Ch2), thereby allowing double discrimination of the lead-out area 130.

In an optical medium according to a second embodiment of the present invention, when formatting the optical medium, a predetermined recording pattern can be recorded in the lead-out area 130, thereby discriminating the lead-out area 130.

The predetermined recording pattern may be, for example, a recording pattern used in the user data area 120. That is to say, among recording patterns used in the user data area 120, a predetermined recording pattern, for example, a 00h pattern, can be repeatedly recorded in the lead-out area 130, thereby recognizing the lead-out area 130.

Alternatively, the recording pattern not used in the user data area 120 is recorded in the lead-out area 130, thereby recognizing the lead-out area 130. For example, a 00h pattern is recorded in the user data area 120 and an FFh pattern as another pattern is recorded in the lead-out area 130. Therefore, in this case, the recording patterns recorded on the lead-out area 130 are different from those used in the user data area 120. Here, the 00h and FFh patterns are recording patterns based on the hexadecimal system.

According to a third embodiment of the present invention, the optical medium includes a user data area 120 and a lead-out area 130, each having grooves 123 and lands 125. Different types of synchronization patterns (to be abbreviated as "sync patterns" hereinafter) are used in the user data area 120 and the lead-out area 130. Thus, the lead-out area 130 is discriminated by recognizing the sync patterns, thereby preventing an optical pickup from deviating from the user data area 120 during recording/reproduction. The sync patterns are recorded on the grooves.

As described above, in an optical recording medium, different types of wobbles are formed on the grooves of the user data area or the lead-out area, thereby preventing an optical pickup that performs recording/reproduction from deviating from the user data area. Further, in an optical recording medium predetermined recording patterns and/or different synchronization patterns can be recorded on the lead-out area and the user data area alone or in addition to the different type wobbles to provide a guard function preventing deviation of the pickup from the user data area. The recording and synchronization patterns in addition to the wobbles can allow double discrimination of the lead-out area. Thus, in the present invention, an optical pickup can be prevented from deviating from the user data area 120 by discriminating between the user data area 120 and the lead-out area 130.

The present invention can accommodate a multi-layer optical recording medium having two or more recording layers as follows. The multi-layer optical recording medium includes a user data area 120 and a lead-out area 130, each having grooves 123 and lands 125. Wobbles 105 and 135 are formed on at least one lateral surface of each of the grooves 123 and the lands 125. The wobbles 105 and 135 may include addressing information or reference time information, e.g., phase locked loop (PLL). To prevent an optical pickup from deviating from the user data area 120, the wobbles 105 and 135 formed in the user data area 120 and the lead-out area 130, respectively, may be modulated into different types of wobbles.

Further, in a multi-layer optical recording medium having two or more recording layers, different recording patterns are formed on each lead-out area of the respective recording layers, thereby discriminating the respective recording layers. For example, in the case of a dual-layer recording medium, a 00h pattern may be recorded on the lead-out area of the first recording layer and an FFh pattern may be recorded on the lead-out area of the second recording layer. By doing so, the recording patterns are read out by a channel 1 (Ch1) and wobble signals based on wobble modulation are read out by a channel 2 (Ch2), during recording and/or reproducing on/from the optical recording medium.

Further, to maintain tracking during interlayer jumping, the width of the lead-out area 130 may be determined to be twice or more times the maximum allowance of disc eccentricity. If disc eccentricity according to injection in the course of manufacture of a disc is approximately 50 µm, the width of the lead-out area 130 is determined to be 100 µm or greater.

According to another embodiment of the present invention, to discriminate the respective recording layers in a multi-layer optical recording medium having two or more recording layers, different sync patterns may be used for each recording layer in the lead-out area 130.

As described above, according to the present invention, grooves are formed on a user data area and a lead-out area, and different types of wobbles are formed on the grooves of either the user data area or the lead-out area, thereby configuring a recording layer of a multi-layer recording medium to have a same condition and providing a discriminating lead-out area. The discriminating lead-out area prevents an optical pickup that performs recording/reproduction from deviating from the user data area. Also, the configuration of the whole area of a recording layer to have the same condition, prevents deterioration in reproduction and/or recording due to a difference in light power transmittance of another higher (upper) recording layer. For example, in a dual layer optical recording medium, the whole area of a first recording layer is configured to have a same condition to prevent deterioration in reproduction and/or recording, which requires light power adjustment, on a second layer due to a difference in a transmittance of the first recording layer. Therefore, in case of a multi-layer rewritable optical recording medium according to the present invention, recording can be performed on the grooves 123 or on both the grooves 123 and the lands 125 and the optical pickup can maintain a uniform light power during reproduction and/or recording on respective recording layers.

By using such wobbles according to the present invention, a whole area of a recording layer can be configured to have a same condition, preventing deterioration in reproduction and/or recording due to a difference in the transmittance of a recording layer. Although the whole area of the recording layer is configured to have the same condition, in the present invention, an optical pickup can be prevented from deviating from the user data area 120 and the respective recording layers can be discriminated by using the wobbles according to the present invention and/or the above described recording and synchronization patterns.

While this invention has been particularly shown and described with reference to example embodiments thereof, it will be understood by those skilled in the art that various changes in form and details may be made therein without departing from the spirit and scope of the invention as defined by the appended claims.

What is claimed is:

1. An optical recording medium comprising:
    an user data area comprising first wobbles modulated by a first modulation method and having a first modulation frequency; and
    a lead-out area comprising second wobbles modulated by a second modulation method and having a second modulation frequency,
    wherein the first modulation frequency is different from the second modulation frequency.

2. An apparatus for reproducing data from an information storage medium comprising an user data area comprising first wobbles modulated by a first modulation method and having a first modulation frequency and a lead-out area comprising second wobbles modulated by a second modulation method and having a second modulation frequency, the apparatus comprising:
    a pickup unit to emit a light to transfer data with respect to the information storage medium; and
    a controller to control the pickup unit to reproduce the first wobbles of the first area and to reproduce predetermined data recorded on the first area,
    wherein the first modulation frequency is different from the second modulation frequency.

3. An apparatus for reproducing and recording data from and on an information storage medium comprising an user data area comprising first wobbles modulated by a first modulation method and having a first modulation frequency and a lead-out area comprising second wobbles modulated by a second modulation method and having a second modulation frequency, the apparatus comprising:
    a pickup unit to emit a light to transfer data with respect to the information storage medium; and
    a controller to control the pickup unit to reproduce the first wobbles of the first area,
    wherein the first modulation frequency is different from the second modulation frequency.

4. A method for recording data on an information storage medium comprising an user data area comprising first wobbles modulated by a first modulation method and having a first modulation frequency and a lead-out area comprising second wobbles modulated by a second modulation method and having second modulation frequency, the apparatus comprising:
    recording data on one recording layer of the information storage medium,
    wherein the recording of the data comprises recording in the user data area according to the second wobbles, which differ from the first wobbles.

5. The method of recording of claim 4, further comprising maintaining tracking during interlayer jumping between recording layers from outermost circumferences of the recording layers according to the second wobbles.

6. The method of claim 4, further comprising forming the second wobbles in the lead-out area to prevent an optical pickup from deviating from the user data area.

7. The method of claim 4, wherein the information storage medium comprises a plurality of recording layers.

* * * * *